United States Patent [19]

Tsujii et al.

[11] 4,397,042
[45] Aug. 2, 1983

[54] OPTICAL MODULATION/DEMODULATION SYSTEM

[75] Inventors: Koichi Tsujii; Yasuo Itai, both of Osaka, Japan

[73] Assignee: Sumitomo Electric Industries, Ltd., Osaka, Japan

[21] Appl. No.: 285,749

[22] Filed: Jul. 22, 1981

[51] Int. Cl.³ ............................................. H04B 1/00
[52] U.S. Cl. .................... 455/608; 455/611; 455/617; 375/110; 307/261
[58] Field of Search ............... 455/608, 618, 612, 611, 455/610, 617, 613, 619; 375/17, 110, 20; 360/41; 340/347 DD; 307/209, 261

[56] References Cited

U.S. PATENT DOCUMENTS

| | | | |
|---|---|---|---|
| 4,006,304 | 2/1977 | Sell | 455/608 |
| 4,236,256 | 11/1980 | Brackett et al. | 455/608 |
| 4,307,468 | 12/1981 | Beasley et al. | 455/608 |
| 4,314,370 | 2/1982 | Figoi | 455/608 |

OTHER PUBLICATIONS

P. Abramson, "High-Speed Bipolar Data Transmission System", IBM Technical Disclosure Bulletin, vol. 23, #12, 5-81, p. 5511.

Lawrence Foltzer, "Low-Cost Transmitters; Receivers Serve Well in Fiber-Optic Links", EBM vol. 28, #19, pp. 141-146, 10-28-80.

Primary Examiner—Robert L. Griffin
Assistant Examiner—Edward L. Coles

[57] ABSTRACT

An optical modulation/demodulation system comprising a transmitting side circuit which is capable of detecting the leading or the falling edge of a timing pulse, converting the leading and falling detection pulse signal into the pulse of either positive or negative polarity in response to the level of the electric-input signal data, in the case of synchronous systems. The transmitting side circuit in asynchronous systems is capable of generating pulses in response to the leading and falling edge of an electric input signal data, by converting the leading and falling pulse into the one of either positive or negative polarity, overlapping these positive or negative polarity signals on a ready-for-sending signal of a predetermined to be used as an input signal for a light-emitting element.

4 Claims, 6 Drawing Figures

OPTICAL MODULATION/DEMODULATION SYSTEM

BACKGROUND OF THE INVENTION

The present invention relates to an optical modulation/demodulation system in which optical fibers are used as the signal transmission path.

Conventionally, an optical modulation/demodulation system for transmitting data by means of optical fibers utilizes the modulation of light intensity for converting the bit pattern of the binary data to be transmitted directly into an optical signal by using luminous elements; in other words, it is adapted to supply electric current to a luminous element so as to make it emit light when the binary data to be transmitted is at the level "1" while it makes the element stop emission when the binary data is at the level "0", thereby transmitting data through optical fibers.

In prior art, on the receiving side, it is necessary to convert the optical signal transmitted through the optical fibers into an electric signal, to synchronize various circuits in the receiving side to be operated in the proper order and at chronological intervals and to properly select transmitted data. In order to synchronize various circuits there have been proposed such methods as transmitting a synchronizing signal via a separate transmission line or extracting a clock component from transferred data. Such a method, however, is defective in that the system may involve a complicated structure; especially in the method of extracting a clock component from transferred data, the clock component can not be extracted if the level "0" should continue.

The present invention aims to improve the above mentioned defects and to provide an optical modulation/demodulation system which is capable of transmitting and receiving data either with synchronization or without synchronization with a simple structure. The present invention will now be described in more detail by way of embodiments.

OUTLINE OF THE INVENTION

Figure 1:
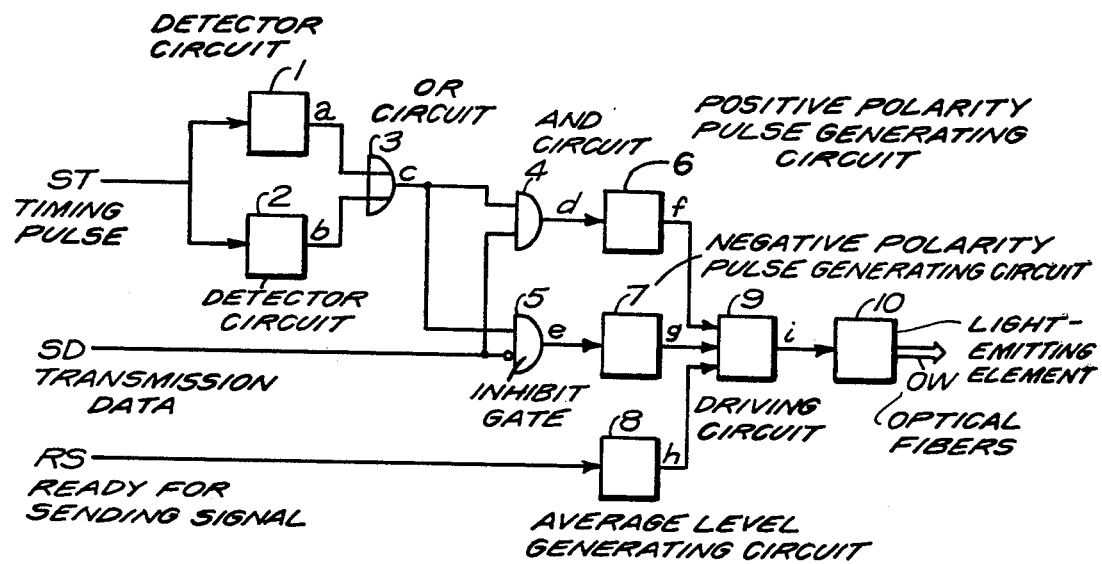
FIG. 1 is a block diagram of the transmitting side of an embodiment of an optical modulation/demodulation system according to the present invention.

The optical modulation/demodulation system according to the present invention enables data transmission by means of optical fibers simply by connecting the system to an electric modulation/demodulation system used for processing data of international standards. The present invention further provides an optical modulation/demodulation system which is extremely applicable since it can be applicable both to a synchronous type and an asynchronous type.

In the case of a synchronous type, the present invention provides an optical modulation/demodulation system comprising a transmitting side circuit which is capable of detecting the leading or the falling edge of a timing pulse, converting the leading and falling detection pulse signal into the pulse of either positive or negative polarity in response to the level of the electric input signal data, overlapping these positive or negative polarity pulses on the ready for sending signal of a predetermined level to be used as an input signal for a luminous element and thus obtaining an optical output signal which has been intensity-modulated and a receiving side circuit which is capable of transmitting the above optical signal through a light transmission path which connects the light-emitting element with the light-receiving element, inputting the signal which is received by the light-receiving element, converted to an electric signal and then outputted again into a gain variable amplifier, obtaining the average of the output, comparing the averaged output with the output from said gain variable amplifier, deciding the polarity thereof to obtain a binary signal, inputting said binary signal into the set and the reset terminals of a flip-flop circuit respectively, outputting a received data signal from the output side of the flip-flop circuit and simultaneously forming a timing signal out of said binary signal.

In the case of an asynchronouse type, the present invention provides a system comprising a transmitting side circuit which is capable of generating pulses in response to the leading and falling edge of an electric input signal data, converting said leading and falling pulse into the one of either positive or negative polarity, overlapping these positive and negative polarity signals on a ready-for-sending signal of a predetermined level to be used as an input signal for a light-emitting element and thus obtaining the optical output signal which has been intensity-modulated and a receiving side circuit which is capable of transmitting said light signal through an optical transmission path which connects a light-emitting element to a light receiving element, inputting the signal which is received by the light-receiving element, converted to an electric signal and then outputted again into a gain variable amplifier, obtaining the average of the output, comparing the averaged output with the output from said gain variable amplifier, deciding the polarity thereof to obtain a binary signal, inputting said binary signal into the set and the reset terminals of a flip-flop circuit respectively, and outputting a received data signal from the output side of the flip-flop circuit.

DESCRIPTION OF THE PREFERRED EMBODIMENT

FIG. 1 illustrates a block diagram of an embodiment of the present invention on the transmitting side. The system comprises a detector circuit 1 to detect a leading edge of a timing pulse ST and generate a pulse to feed to one of the input terminals of an OR circuit 3, a detector circuit 2 to detect a falling edge of a timing pulse ST and generate a pulse to feed to the other input terminal of the OR circuit 3, an AND circuit 4 and an inhibit gate 5 to which the output signal from the OR circuit 3 and a transmission data SD are fed, a positive polarity pulse generating circuit 6 to generate a pulse of positive polarity in response to the output signal from the AND circuit 4 and feed the same to a driving circuit for the light-emitting element 9, a negative polarity pulse generating circuit 7 to generate a pulse of negative polarity in response to the output signal from the inhibit gate 5 and feed the same to the driving circuit for the light-emitting element 9, an average level generating circuit 8 to feed a signal of a predetermined level to the driving circuit for the light-emitting element 9 when it receives a ready for sending signal RS and a light-emitting element 10 which is driven by a signal synthesized by the driving circuit for the light-emitting element 9. The references a through i denote signals at various parts.

Figure 3:
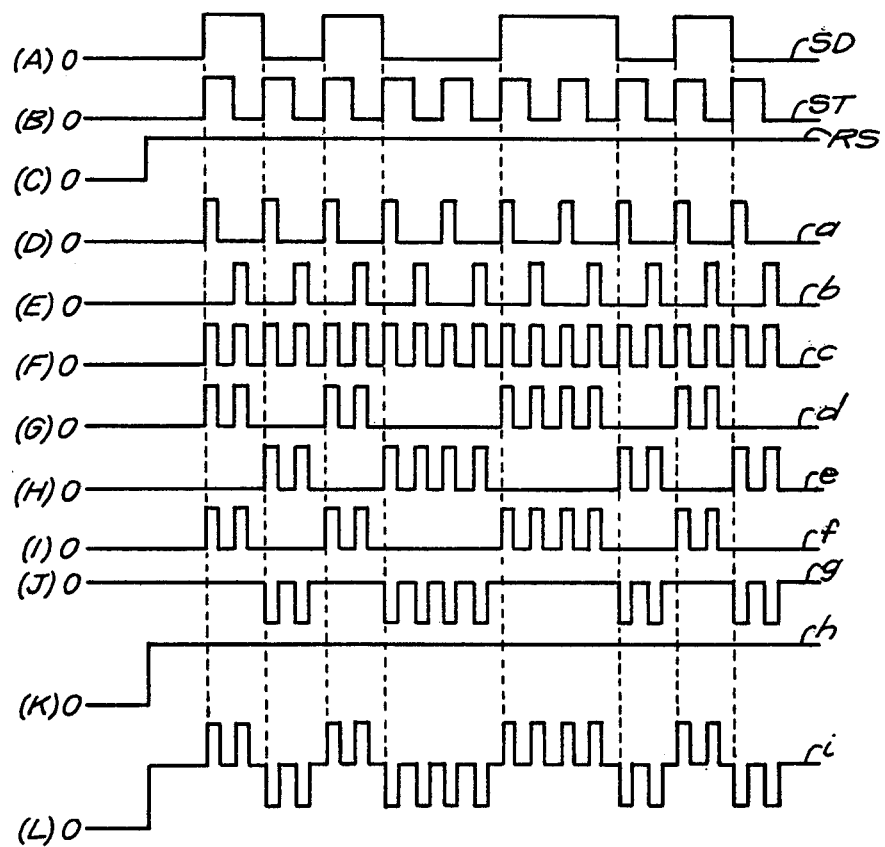
FIG. 3 illustrates the wave forms of signals at various parts of a synchronous type of the transmitting side shown in FIG. 1.

Assuming that a transmission data SD is as shown in FIG. 3 (A), a timing pulse ST in FIG. 3 (B) and a ready for sending signal RS in FIG. 3 (C), the leading edge detection circuit 1 and the falling edge detection circuit 2 output signals a and b at the time when they detect the leading and the falling edges of a timing pulse ST respectivly and feed them to the OR circuit 3 as shown in FIG. 3 (D) and (E). The OR circuit 3 outputs a signal c shown in FIG. 3 (F) and feeds it to the AND circuit 4 and the inhibit gate 5. The AND circuit 4 and the inhibit gate 5 have also been fed with a transmission data SD of FIG. 3 (A). The AND circuit 4 outputs a signal d of FIG. 3 (G) while the inhibit gate 5 outputs a signal e of FIG. 3 (H), the signals being supplied to the positive polarity pulse generating circuit 6 and the negative polarity pulse generating circuit 7.

The positive polarity pulse generating circuit 6 generates a signal f of FIG. 3 (I) when it is triggered by 1 shot at the leading of the signal d while the negative polarity pulse generating circuit 7 generates a signal g of FIG. 3 (J) when it is triggered by 1 shot at the leading of the signal e, the signals being supplied to the light-emitting element driving circuit 9. The light-emitting element driving circuit 9 is also fed with a signal h of FIG. 3 (K) of a predetermined level which is formed by feeding a ready for sending signal RS of FIG. 3 (C) to the average level generating circuit 8. The circuit 9 then overlapps the signal h on the positive polarity pulse f and the negative polarity pulse g so as to outputs a signal i of FIG. 3 (L) for driving the light-emitting diode 10. In other words, the light-emitting element 10 is made to output a predetermined level as a carrier when the output signal i from the light-emitting element circuit 9 is at the level of the output signal h from the average level generating circuit 8, a level higher than the predetermined level when it is the level obtained by overlapping the signal h on the positive polarity pulse f, and a level lower than the predetermined level when it is the level obtained by overlapping the signal h on the nagative polarity pulse g.

Figure 5:
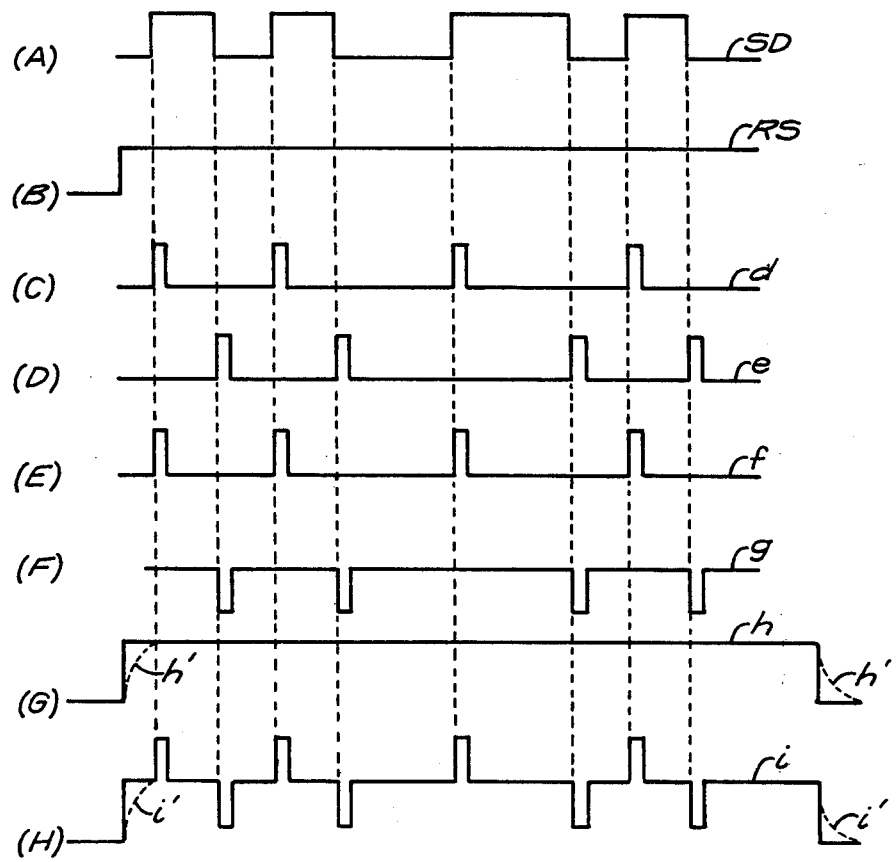
FIG. 5 shows the wave forms of signals at various parts of an asynchronous type of the transmitting side shown in FIG. 1.

The above mentioned embodiment is of a synchronous system which uses timing pulses (transmission timing pulse ST and receiving timing pulse RT) for synchronizing transmission signals. The embodiment, however, is readily switched to an asynchronous system which does not use timing signals (ST, RT) for data transmission, which is also called as a start-and-stop system. In the asynchronouse system, the ST is omitted in the transmission side as shown in FIG. 1 and if the output C of the OR circuit 3 of FIG. 1 is maintained at the state indicated by the reference number 1, the signals f and g pulsate only when the transmission signal SD leads or falls as indicated in FIG. 5. In FIG. 5, SD and RS are indentical to the ones shown in FIG. 3 while signals d,e,f, and g are asynchronous pulses in response to the leading and the falling of SD. The signals are to be fed to the light-emitting element driving circuit 9 together with the signal h to output a signal i. In case of asynchronous system, since the leading edge of a signal is detected on the receiving side to generate a binary signal pulse, there is a danger of the binary circuit to start at a sharp wave front of the signal h which is overlapped on the wave form of an output from the light-receiving element. It is, therefore, necessary to give an gently curved slope to the wave front of the signal h to assume a curve indicated by the dotted line h' in FIG. 5 (G) by using the RC circuit or the like. The output i from the light-emitting element driving circuit in this case will assume a curve indicated by the dotted line i' in FIG. 5 (H).

Figure 2:
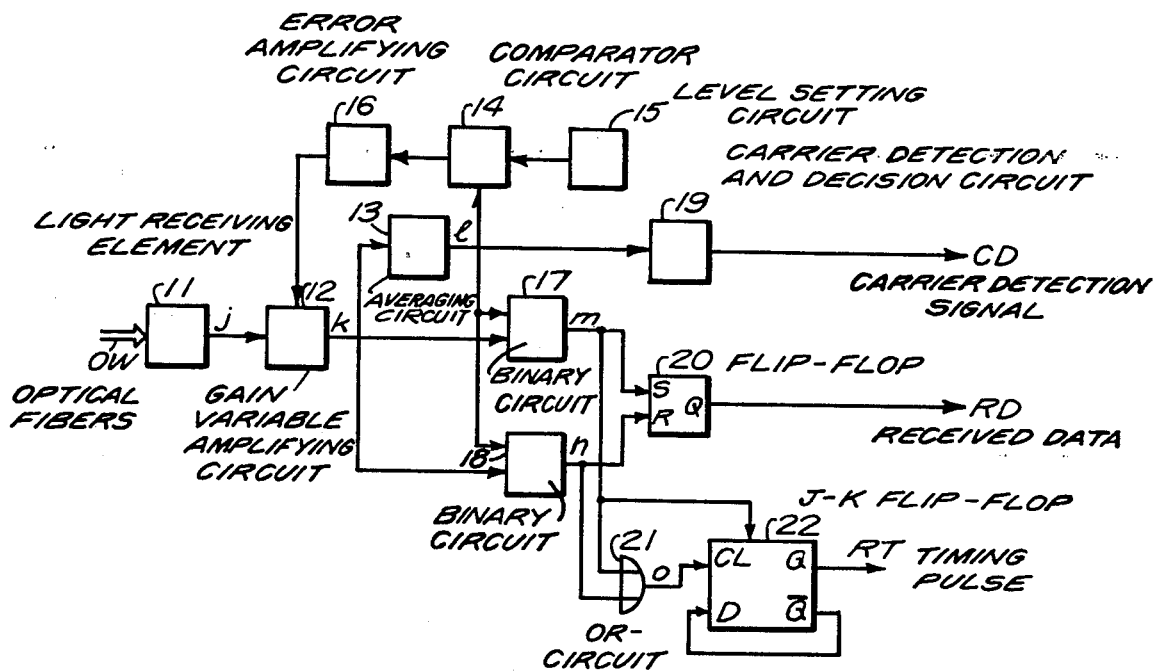
FIG. 2 is a block diagram of the receiving side of an embodiment of an optical modulation/demodulation system according to the present invention.

FIG. 2 illustrates a block diagram of an light receiving side of the optical modulation/demodulation system according to the present invention. The optical signal from the light-emitting element shown in FIG. 1 is transmitted by means of optical fibers OW, received by a light-receiving element of the light-receiving device shown in FIG. 2 and converted into an electric signal.

Figure 4:
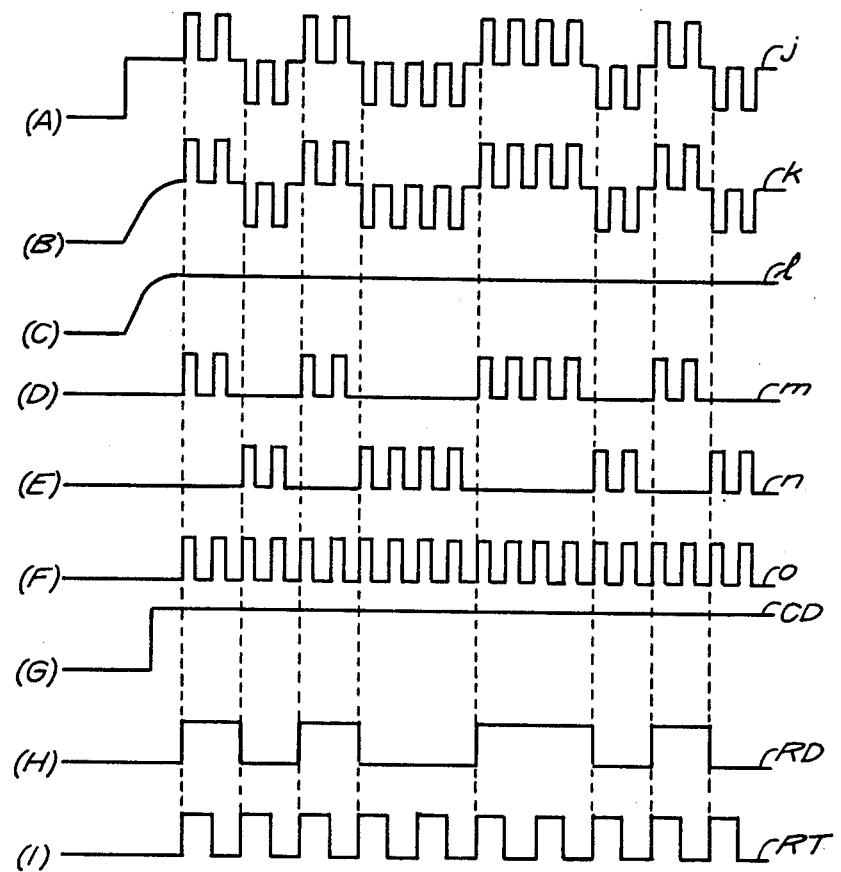
FIG. 4 shows the wave forms of signals at various parts of a synchronous type of the receiving side shown in FIG. 2.

The light receiving device of FIG. 2 mainly comprises a light receiving element 11 to receive a light signal transmitted by means of the optical fiber OW and convert the same into an electric signal, a gain variable amplifying circuit 12 to amplify the output electric signal from the light receiving element 11 to a predetermined level, an averaging circuit 13 to average the output signal from the gain variable amplifying circuit 12, a carrier detection and decision circuit 19 to generate a carrier detection signal CD when the output signal from the averaging circuit 13 exceeds the predetermined level, binary circuits 17 and 18 to convert the signal from the gain variable amplifying circuit 12 into a binary signal by using the output signal from the averaging circuit 13 as the floating standard level, a flip-flop 20 to output a received data from the output signals of the binary circuits 17 and 18, an OR circuit 21 to generate a receiving timing pulse from the output signal from the binary circuits 17 and 18 and a J-K flip-flop 22. A comparator circuit 14, a level setting circuit 15 and an error amplifying circuit 16 are provided for controlling the amplification factor of the gain variable amplifying circuit 12. References j through o denote signals at various parts. The light signal transmitted via the optical fiber OW is converted to an electric signal by the light receiving element 11 to be fed to the gain variable amplifying circuit 12. For example, suppose the signal j generated from the light receiving element 11 is as shown in FIG. 4 (A), the gain variable amplifying circuit 12 amplifies the signal j to a predetermined level and outputs a signal k as shown in FIG. 4 (B). The signal k is fed to one of the input terminals of the binary circuits 17 and 18 and the averaging circuit 13. The averaging circuit 13 averages the signal k to output the signal l as shown in FIG. 4 (C), and fed the same to the other terminal of the binary circuits 17 and 18 as well as to the comparative circuit 14 and the carrier detection/decision circuit 19.

The comparative circuit 14 compares the level of the signal l with the standard level fed from the level setting circuit 15, supplies the difference in the level to the error amplifying circuit 16. The error amplifying circuit 16 amplifies by a suitable amplification factor and supplies to the gain variable amplifying circuit 12 for the gain control thereof. The carrier detection/decision circuit 19 decides that a carrier has been transmitted when the signal l exceeds a predetermined level and outputs a carrier detection signal CD as shown in FIG. 4 (G).

The binary circuit 17 compares the output signal l from the averaging circuit 13 with a signal which is obtained by dividing the voltage of the signal k by a suitable voltage dividing ratio and, when the level of the signal l is lower than the other, outputs the signal m as shown in FIG. 4 (D) with the output level "1" to feed the S terminal of the flip-flop 20 and one of the input terminals of the OR circuit 21. The binary circuit 18, on the other hand, compares the output signal k from the averaging circuit 13 with a signal which is obtained by dividing the voltage of the output signal l at a suitable voltage dividing ratio and, when the level of the signal k is lower than the other, outputs the signal n as shown in FIG. 4 (E) with the output level "1" to feed the R terminal of the flip-flop 20 and to one of the input terminals or the OR circuit 21. When receiving the binary signals m and n, the flip-flop 20 outputs from the Q terminal the received data RD as shown in FIG. 4 (H) while the OR circuit 21 outputs a signal O as shown in FIG. 4 (F) to feed the CL terminal of the J-K flip-flop 22. Receiving the signal O, the J-K flip-flop 22 outputs the receiving timing pulse RT from the Q terminal as shown in FIG. 4 (I), whereby the receiving timing pulse RT can synchronize various parts.

Figure 6:
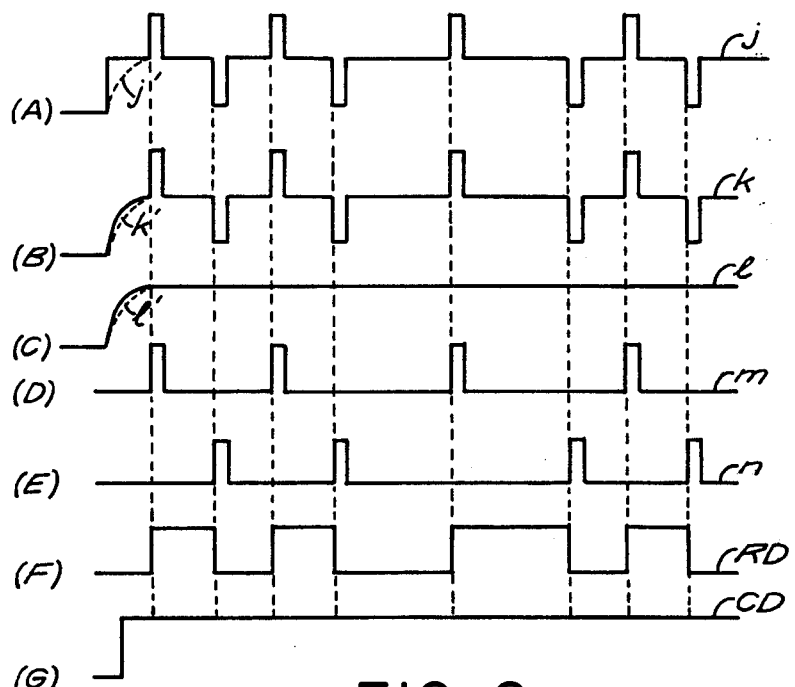
FIG. 6 illustrates the wave forms of signals at various parts of an asynchronous type of the receiving side shown in FIG. 2.

Further, to make the system applicable to the case where transmitting side is an asynchronous system, the signal j outputted from the light receiving element 11 assumes the wave form as shown in FIG. 6 (A) on the receiving side and the output k of the gain variable amplifying circuit 12 becomes as shown in FIG. 6 (B). The output signal k is fed to the one of the input terminals of the binary circuits 17, 18 and to the averaging circuit 13. The averaging circuit 13 averages the signal k to output the signal l as shown in FIG. 6 (C) to the other terminals of the binary circuits 17, 18, the comparator circuit 14 and the carrier detection/decision circuit. The comparator circuit 14 compares the level of the signal l with the standard level fed from the level-setting circuit 15, feeds the difference in the levels to the error amplifying circuit 16 so as to control the gain at the gain variable amplifying circuit 12 with the output from the error amplifying circuit 16. The carrier detection decision circuit judges whether the signal l exceeds the predetermined level to output a carrier signal CD as shown in FIG. 6 (G).

The binary circuit 17 outputs the signal m as shown in FIG. 6 (D) while the binary circuit 18 outputs the signal n as shown in FIG. 6 (E) to feed the same to the S and R terminals of the flip-flop 20 respectively. When receiving the binary signals m and n, the flip-flop 20 outputs the receiving data RD as shown in FIG. 6 (F) from the Q terminal.

As described hereinabove, the system according to the present invention is provided with a means to generate pulses at the leading and falling edges of timing pulses which are transmitted from the transmitting side for synchronizing the receiving side, to convert said pulses into positive or negative polarity pulses in response to the level of the binary data to be transmitted and to, with said positive and negative pulses, intensity-modulate the light emitting element which outputs light signals with a predetermined level as a carrier by means of ready-for-sending signals. Therefore, it can not only transmit a timing pulse and a transmitting data simultaneously but also transmit a carrier. It is also provided with a carrier detection circuit to output a carrier detection signal when an electric signal which has been converted from the light signal transmitted through optical fibers is beyond a predetermined level, a means to convert said electric signal into a binary data, and a means to convert said electric signal into receiving timing pulse, whereby it can receive data while achieving synchronization with a simple construction.

Since it can be adapted to receive data in an asynchronous system, the optical modulation-demodulation system according to the present invention can easily replace systems which operate transmission or reception of data through either a synchronous system or an asynchronous system and can be used for data transmission by means of optical signals simply by adding optical fibers. It is therefore widely applicable and extremely economical.

What we claim is:

1. A synchronous type optical modulation-demodulation system connected by an optical fiber cable, comprising: a transmitting circuit having a leading edge and falling edge detection circuit for outputting pulses in response to a leading edge and falling edge of a timing pulse, a positive or negative polarity pulse generating circuit for generating positive or negative polarity pulse signals from the output pulses from said leading edge and falling edge detection circuit in such a manner that said positive polarity pulse signals and negative polarity pulse signals are respectively a number of an integer multiple of two in response to two levels of "0" and "1" of an input data signal, a light emitting element driving circuit for inputting and superimposing said positive polarity and negative polarity pulse signals and a signal having a predetermined flat level made from a ready-for sending signal and for outputting a driving signal, a light emitting element whose light intensity is modulated by said driving signal so as to output a carrier signal when said output signal from said light emitting element driving circuit is only at the predetermined flat level and so as to output a stronger light signal when said output signal is higher than said flat level signal and so as to output a weaker light signal when said output signal is lower than said flat level signal, optical coupling means for guiding output light signals of said light emitting element into an optical fiber cable, a receiving circuit having a light receiving element for converting the light signal transmitted through said optical fiber cable into an electric signal, a gain variable amplifying circuit for amplifying said electric signal to obtain an output signal of a predetermined level and whose gain is controlled to obtain said level, an averaging circuit for averaging the output signal from said gain variable amplifying circuit to obtain a predetermined flat level signal, a pair of binary circuits for inputting the output signal of said gain variable amplifying circuit and the output signal of flat level from said averaging circuit and for outputting individually binary signals when the former is higher or lower than the latter, a flip-flop circuit for inputting the binary signals from each binary circuit at the set and reset terminals of said flip-flop circuit and for outputting a receiving data signal, and a flip-flop circuit for inputting the binary signals from said pair of binary circuits and for outputting a receiving timing pulse.

2. A synchronous type optical modulation-demodulation system as claimed in claim 1, wherein the leading edge of the received data from the flip-flop circuit which outputs received data coincides with the leading edge of the receiving timing pulse from the flip-flop circuit which outputs the receiving timing pulse.

3. An asynchronous optical modulation-demodulation system connected by an optical fiber cable, comprising: a transmitting circuit having a leading and falling edge detection circuit for outputting pulses in response to a leading edge and falling edge of an electric input data signal, a positive and negative polarity pulse generating circuit for generating a positive or negative polarity pulse signal in response to the output signal from said leading and falling edge detection circuit respectively, a light emitting element driving circuit for inputting and superposing said positive and negative polarity pulse signals and a signal having a predetermined flat level made from a ready-for-sending signal and for outputting a driving signal, a light emitting element whose light intensity is modulated by said driving signal so as to output a carrier signal when said output signal from said light emitting element driving circuit is only at the predetermined flat level, and for outputting a stronger light signal when said output signal is higher than said flat level and for outputting a weaker light signal when said output signal is lower than said flat level, optical coupling means for guiding the output light data signal of said light emitting element into an optical fiber cable, a receiving circuit having a light receiving element for converting the light data signal transmitted through said optical fiber cable into an electric data signal, a gain variable amplifying circuit for amplifying said electric data signal to obtain a predetermined output level and whose gain is controlled to obtain said level, an averaging circuit for averaging the output signal from said gain variable amplifying circuit to obtain a predetermined flat level signal, a pair of binary circuits for inputting the output signal of said gain variable amplifying circuit and said flat level signal from said averaging circuit and for outputting individually binary signals when the former is higher or lower than the latter, and a flip-flop circuit for inputting the binary signal at the set and reset terminals of said flip-flop circuit and for outputting a receiving data signal.

4. An asynchronous type modulation-demodulation system as claimed in claim 1 wherein, when a signal is inputted into the light emitting element driving circuit at a predetermined level in response to the ready-for-sending signal, the leading and the falling wave forms are made to be of a gradual curve.

* * * * *